US008856463B2

(12) United States Patent
Rau (10) Patent No.: US 8,856,463 B2
(45) Date of Patent: Oct. 7, 2014

(54) SYSTEM AND METHOD FOR HIGH PERFORMANCE SYNCHRONOUS DRAM MEMORY CONTROLLER

(76) Inventor: Frank Rau, Heilbronn (DE)

( * ) Notice: Subject to any disclaimer, the term of this patent is extended or adjusted under 35 U.S.C. 154(b) by 851 days.

(21) Appl. No.: 12/336,125

(22) Filed: Dec. 16, 2008

(65) Prior Publication Data

US 2010/0153611 A1 Jun. 17, 2010

(51) Int. Cl.
*G06F 12/00* (2006.01)
*G06F 13/16* (2006.01)
*G06F 12/08* (2006.01)

(52) U.S. Cl.
CPC ........ *G06F 13/1673* (2013.01); *G06F 12/0886* (2013.01); *G06F 12/0831* (2013.01)
USPC ........... 711/154; 711/148; 711/209; 711/147; 711/E12.001

(58) Field of Classification Search
CPC .......................... G06F 12/0831; G06F 12/0886
See application file for complete search history.

(56) References Cited

U.S. PATENT DOCUMENTS

| 6,125,421 | A  | * | 9/2000  | Roy ................................... 711/5 |
| 6,298,420 | B1 |   | 10/2001 | Chittor et al. |
| 6,526,462 | B1 | * | 2/2003  | Elabd ............................ 710/242 |
| 6,754,751 | B1 |   | 6/2004  | Willke et al. |
| 7,278,008 | B1 | * | 10/2007 | Case et al. ..................... 711/209 |
| 7,424,579 | B2 |   | 9/2008  | Wheeler et al. |
| 8,073,974 | B2 | * | 12/2011 | Rapp et al. ..................... 709/247 |
| 2001/0021971 | A1 | * | 9/2001 | Gibson et al. .................. 712/215 |
| 2002/0037011 | A1 | * | 3/2002 | Musoll et al. .................. 370/400 |
| 2004/0034710 | A1 |   | 2/2004 | Rau |
| 2006/0184708 | A1 | * | 8/2006 | Sleeman et al. .............. 710/313 |
| 2007/0127484 | A1 |   | 6/2007 | Rau |
| 2010/0005250 | A1 | * | 1/2010 | Simon et al. .................. 711/154 |
| 2010/0088554 | A1 | * | 4/2010 | Udell et al. ..................... 714/49 |

OTHER PUBLICATIONS

"Xilinx Memory Interface Generator (MIG) User Guide: DDR SDRAM, DDRII SRAM, DDR2 SDRAM, QDRII SRAM, and RLDRAM II Interfaces", UG086 (v2.0) Sep. 18, 2007, Chapter 3.
"Xilinx Memory Interface Generator (MIG) User Guide: DDR SDRAM, DDRII SRAM, DDR2 SDRAM, QDRII SRAM, and RLDRAM II Interfaces", UG086 (v2.0) Oct. 2, 2008, Chapter 3.

* cited by examiner

*Primary Examiner* — Mardochee Chery
*Assistant Examiner* — Arvind Talukdar
(74) *Attorney, Agent, or Firm* — Chapin IP Law, LLC (57) ABSTRACT

The disclosed system and method enhances performance of pipelined data transactions involving FIFO buffers by implementing a transaction length indicator in a transaction header. The length indicator in the header is formed by components coupled to a memory controller through FIFO buffers. The memory controller uses the length indicator to execute pipelined data transfers at relatively high speeds without causing additional inadvertent shifts or indexes in the FIFO buffer being read. The system and method can be applied to any memory type in general, and avoids the use of additional control signals or added complexity or size in the memory controller.

25 Claims, 8 Drawing Sheets

SYSTEM AND METHOD FOR HIGH PERFORMANCE SYNCHRONOUS DRAM MEMORY CONTROLLER

BACKGROUND

Synchronous Dynamic Random Access Memories (SDRAMs) can provide high data bandwidth with relatively inexpensive costs. A challenge in obtaining high system performance in SDRAMs, such as Double Data Rate SDRAM (DDR-SDRAM), stems from overhead used to manage data transactions. Each transaction, such as a read or write, for example, entails a certain initial latency for setup prior to execution.

Modern microprocessor systems can be sensitive to latency in transactions involving SDRAM. Typically, microprocessors run at a much higher speed internally than a given memory subsystem. Optimized performance for the microprocessor can depend on the performance of the memory subsystem. A number of conventions are used to improve performance of the SDRAM in transactions involving a microprocessor to boost overall system performance.

One convention used to increase performance in SDRAM memory subsystems is to provide a steady data stream in a transfer mode generally referred to as a burst operation. A burst operation typically consists of a memory transaction involving a transfer of multiple data words.

Memory transactions are typically implemented using a memory controller to control the transactions between multiple components seeking to use memory resources coupled to a shared resource such as a common bus. The memory controller performs various control functions for granting access to the memory, such as arbitration between the multiple components. The memory controller typically has a control interface for receiving and sending control signals and information. A control interface can be implemented that permits the components sharing the bus to initiate random length burst operations to obtain enhanced performance. Random length burst operations are often used in PCI (peripheral component interconnect) express devices (PCIe) and DMA (direct memory access) controllers.

One known technique for dealing with control of random length burst operations in a memory processing system is to provide additional dedicated control signals. For example, control signals may be separately provided in an interface for indicating an address phase, a read or write operation phase and a final data word of a random length burst transaction. The dedicated control signal interface is shared between all the devices connected to the memory, so that an arbitration step is usually used, which adds to the overhead and latency of this approach. In addition, when being refreshed, the DRAM is inaccessible, disadvantageously resulting in additional latency using this approach.

Another known technique for implementing random length burst operations is to employ first in first out (FIFO) buffers for the data transaction. The FIFO buffers can be implemented to take advantage of pipelining techniques that can obtain high clock rates, since the data shifts, or is indexed through the FIFO buffer in a registered chain. The random length data is placed in the FIFO buffer, and then read out in a pipelined burst operation. Challenges can arise, however, in properly executing the burst operation when reading data out of the FIFO buffer in that more data may be inadvertently read than is desired for the particular data transaction. When the burst operation is executed at high speed, a logical determination of the end of the data may take longer than a transfer of a data word out of the FIFO buffer. Inadvertent reading causes data to be shifted, or indexed, out of the FIFO buffer, resulting in data loss. Furthermore, if this type of FIFO interface is implemented in a low-cost field programmable gate array (FPGA), it tends to be sensitive to timing issues, such as stopping a read operation from a FIFO buffer upon detection of the last data word.

It is possible to modify the FIFO technique, as well as the control signal interface approach, to use faster internal resources of the FPGA, such as Flip-Flop devices, but such an approach achieves limited success. For example, the use of Flip-Flop devices occupies approximately 3 times the resources in an FPGA than would be used in a conventional control signal interface. Moreover, because Flip-Flop devices are somewhat scarce in FPGA devices, it may be difficult to obtain enough resources to implement such a memory controller in an FPGA.

Another approach to solving the problem of inadvertent reading of a FIFO buffer beyond the last data word of a random length burst operation is to divide the data transaction into multiple smaller transactions. Because some types of SDRAM have a minimal transaction length of four data words (such as DDR2-SDRAM), this technique can be effective. However, for longer burst operations, a large number of small transactions are executed to achieve the data transaction. In addition, if the addresses for the data transaction are not aligned on the four word data boundary, unused write data is masked, while unused read data is discarded, leading to decreased performance issues. Moreover, two separate buffer memories are used to set up the data transaction, one buffer memory for the transaction information, and another buffer memory for payload data. If the transaction information is included in with the payload data, the performance can decrease significantly, for example, by as much as 20%.

Another technique for avoiding inadvertent reading of a FIFO buffer beyond the last data word of a random length burst operation is to mark the last data word with an identifier. However, with high-speed pipeline FIFO buffers, by the time the identifier is read and interpreted, there is not enough time to stop reading from the FIFO buffer.

SUMMARY

The disclosed system and method enhances performance of pipelined data transactions involving FIFO buffers by implementing a transaction length indicator in a transaction header. The length indicator in the header is formed by components coupled to a memory controller through FIFO buffers. The memory controller uses the length indicator to execute pipelined data transfers at relatively high speeds without causing additional inadvertent shifts or indexes in the FIFO buffer being read. The system and method can be applied to any memory type in general, and avoids the use of additional control signals or added complexity or size in the memory controller.

According to an exemplary aspect, there is disclosed a system and method for implementing a data transaction involving a data read or write request from a requesting component to a memory module. A FIFO buffer coupled to the component receives the request, which includes a header that describes the data transaction and data content. The header has a length indication that describes a length of the data content, or payload, that the data transaction seeks to have transacted. A memory controller coupled to the FIFO buffer and the memory module receives and executes the request. The memory controller has a counting device used to store the length indication and prevent read operations on the FIFO buffer once the indicated length of data has been read.

According to another exemplary aspect, the memory controller and FIFO buffer are coupled to an arbiter, which reads the header and makes a determination of a data transaction request to process. For example, several FIFO buffers may be implemented that can each have a data transaction request for processing. The arbiter selects a FIFO buffer for processing according to criteria such as, for example, a priority indication in the request, whether the request is a read or write, whether the request calls for more than one memory access, the size of the data payload, or any other criteria that may permit the arbiter to select a FIFO buffer for processing. The arbiter controls a multiplexer communicatively coupled between the several FIFO buffers and the memory controller to cause the selected FIFO buffer to be connected to the memory controller for processing.

According to another exemplary aspect, the memory controller has a header register for receiving and storing a copy of a header related to a data transaction request. The header register may be used to provide the counting device with the length indication obtained from the header. The length indication may be in the form of a count of data words involved in the data transaction.

According to another exemplary aspect, there is disclosed a system and method for determining an appropriate payload size when implementing a data transaction request between a transaction requesting component and a memory module. The data transaction request is formed with a header that describes the data transaction and indicates a size of a data payload represented by the request. The size of the data payload that is appropriate for the request is determined in part based on the distance in data words between the address at which the data transaction is to begin, i.e., a read or write address, and a page boundary for the memory configuration. The data payload size is also determined by a maximum data payload size, which may be specified based on the configuration of the memory or other system components or settings. The total length of the data transaction is compared to the distance to the page boundary and to the preset maximum payload size. The appropriate payload size is then determined to be the best fit out of the preset maximum payload size, the total length of the data transaction, the distance to the page boundary, or the smaller of the preset maximum payload size and the distance to the page boundary.

The disclosed system and method may be used in applications such as those involving telecommunications equipment, including in furtherance of the transmission and reception of digital data packets.

BRIEF DESCRIPTION OF THE SEVERAL VIEWS OF THE DRAWINGS

The disclosed system and method is described in greater detail below with reference to the accompanying drawings, of which.

DETAILED DESCRIPTION OF THE PREFERRED EMBODIMENTS

The present disclosure provides a system and method for enhancing performance of the operation of a synchronous dynamic random access memory (SDRAM). Specific control data is provided in a portion of a command field or header that precedes the data content of the transaction. The control data indicates a length of the data content to transfer in the transaction. A memory controller reads the control information to determine the length of the data content, and provides control signals to transfer the specified amount of data content. Various components seeking memory transactions through the memory controller supply a data content length indicator in a portion of the header that precedes the data content in the information comprising the memory transaction. The memory controller can transfer the data content having the specified length in a pipeline burst operation to contribute to improving memory access performance, as well as overall system performance.

Figure 1:
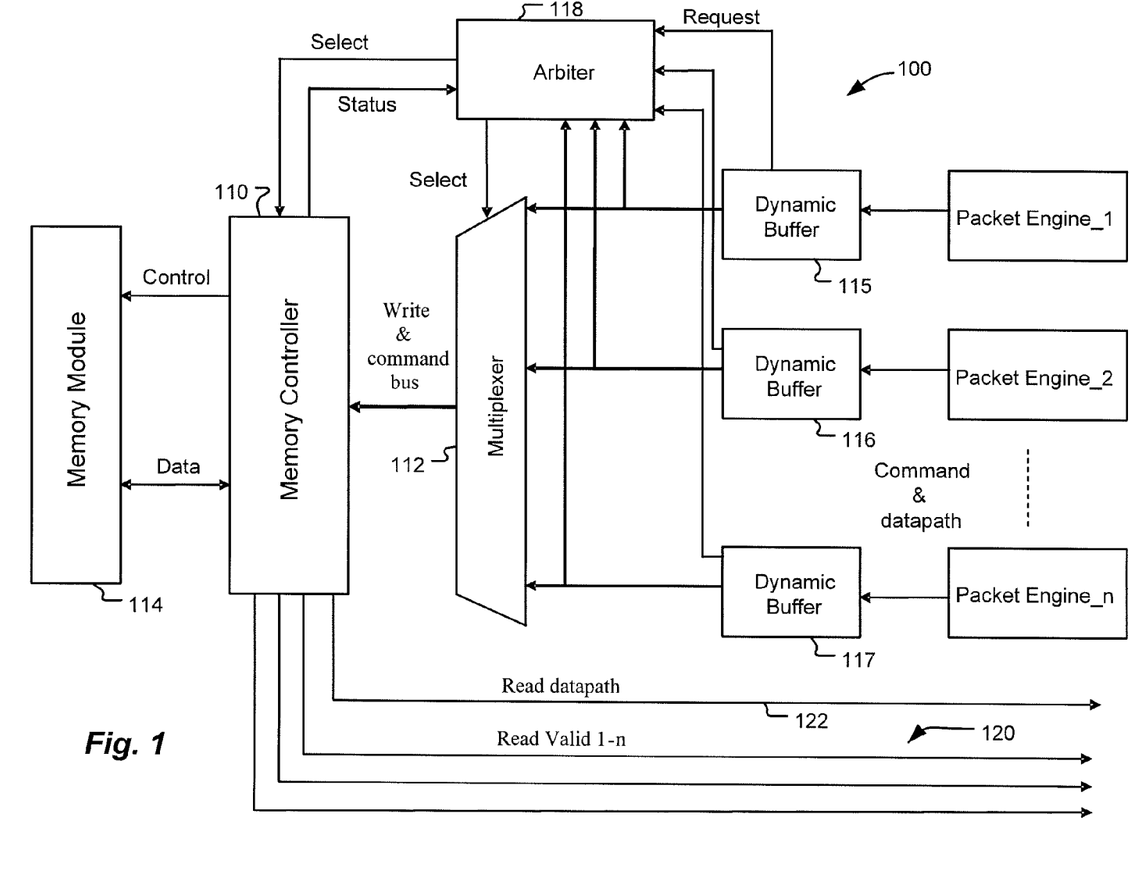
FIG. 1 is a block diagram of a memory controller in accordance with an exemplary embodiment of the disclosed system and method.

Referring now to FIG. 1, a system block diagram of a memory access system 100 that can take advantage of the disclosed system and method is illustrated. Buffers 115, 116 and 117 can be implemented as first in first out (FIFO) buffers that are suitable for pipelined transfers of data. A transaction loaded into any one or more of the FIFO buffers 115-117 can be directed through a multiplexer 112 to a memory controller 110, and thereby request a memory access to a memory module 114. FIFO buffers 115-117 are fall-through type buffers, which means that the first data word is visible at the output of the buffer. In addition, FIFO buffers 115-117 may be dynamic buffers, where a number of data transaction requests having different length data payloads may be loaded into the buffers to be processed in sequence in accordance with conventional operation of a FIFO buffer. When any of the FIFO buffers 115-117 is/are ready with a transaction, the buffer raises a request to an arbiter 118 for processing. Arbiter 118 may optionally be integrated with memory controller 110.

Arbiter 118 may implement a priority-based arbitration or provide a simple round robin process to select a FIFO buffer for processing a data transaction. Optionally, arbiter 118 may examine a flag value (e.g., the priority flag of a request) to make a selection decision. Furthermore, arbiter 118 may examine the address for the data transaction that is visible in FIFO buffers 115-117. The address may be used for detecting page hits, which arbiter 118 may prefer or avoid. Any number of arbitration techniques known to those of ordinary skill in the art may be employed by arbiter 118 to select one of FIFO buffers 115-117 for processing a data transaction in accordance with the disclosed system and method.

Arbiter 118 may conduct the arbitration during time intervals when the memory itself is not accessible, e.g., during precharge operations or refresh cycles. Arbiter 118 may also be pipelined in a way to permit the data path to be ready when the memory itself is ready for a transaction.

Arbiter 118 employs a handshake with core state machines (not shown) within memory controller 110. Memory controller 110 may then read and analyze the transaction header out of the selected port, and set up the transaction accordingly. Port selection may be realized through a multiplexer 112 that connects the selected FIFO buffer to memory controller 110. Memory controller 110 receives pipelined data transaction information from the output of multiplexer 112, including read and write requests. A write request includes a command field, or header, followed by data content that is to be written. In accordance with the disclosed system and method, the header includes an indication of a length of the data content. For example, the length indicator may be a count of data words or bytes to transfer, or an indication of a particular size block of data, such as may be composed of a portion of a data word, a specific number of data words, or combinations or multiples thereof. Memory controller 110 reads the indication of data content length from the header and produces control signals to permit pipelined data transfers to write data to memory module 114.

In the case of a read request, the data fetched from memory module 114 is sent out by memory controller 110 to an independent read data port. This read return configuration avoids delay for any write requests submitted to memory controller 110. Memory controller 110 also produces a dedicated data valid flag asserted for each valid data word. Each device connected to memory controller 110 doing read operations has a private data valid flag, so the read data path may be shared between all devices. The private data valid flag identifies the recipient device in the pending read data transaction in case there are multiple read requests pending from different devices.

Figure 2A:
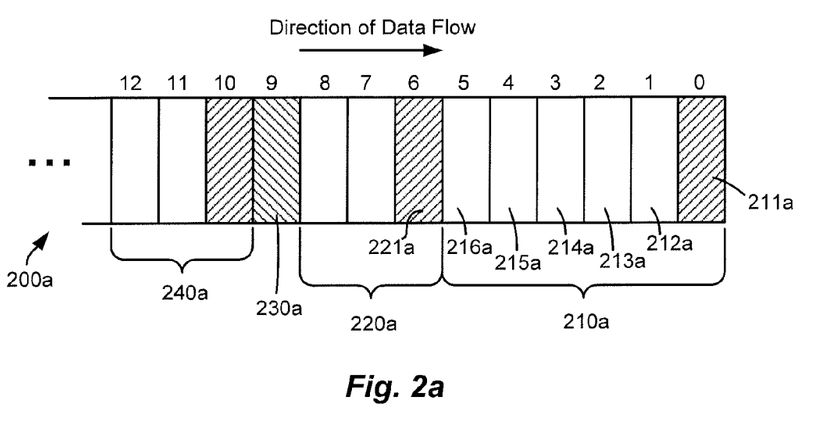
FIGS. 2a and 2b are illustrations of a FIFO buffer in accordance with an exemplary embodiment of the disclosed system and method.
Figure 2B:
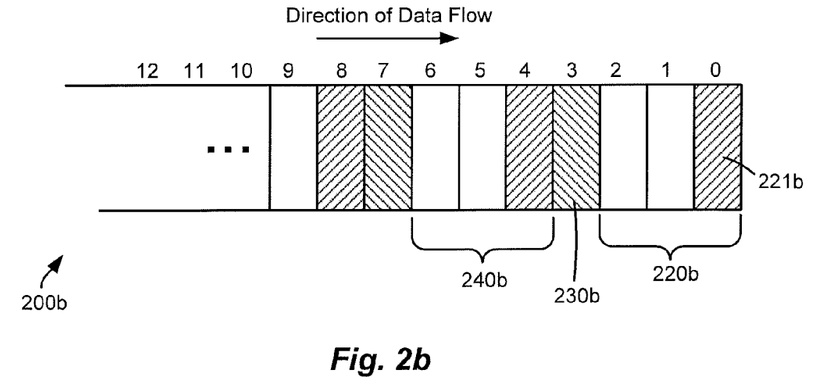

Referring now to FIGS. 2a and 2b, a FIFO buffer of the type identified by FIFO buffers 115-117 in FIG. 1 is illustrated in different stages of data transfer. An output data word 211a is shown at position 0 in FIFO buffer 200a in FIG. 2a. The value of data word 211a is available to be read by memory controller 110 (see FIG. 1), as well as other components of FIG. 1 system 100. FIFO buffer 200a is illustrated in FIG. 2a as having a content that represents several memory transactions 210a, 220a, 230a, and 240a, each of which may be processed by memory controller 110 as a single, separate pipelined transaction. Transaction 210a is an exemplary write transaction with a header 211a and data contents 212a-216a. When transaction 210a is processed, memory controller 110 reads header 211a to determine how the transaction should be processed. Header 211a includes length information for transaction 210a, as well as addressing and other transaction information. The length information in header 211a specifies that five (5) data words 212a-216a are to be processed as part of transaction 210a. Accordingly, memory controller 110 transfers the data in data words 212a-216a using pipelining techniques, and stops the progression of data words through FIFO buffer 200a after transaction 210a has been processed. The resulting format of FIFO buffer 200b is illustrated in FIG. 2b, where transaction 220b is the next transaction to be processed. As with header 211a in transaction 210a, header 221b of transaction 220b is readable by memory controller 110 and other components in system 100.

Data word 230a, 230b illustrated in FIFO buffer 200a, 200b indicates a read operation. When data word 230a, 230b is indexed to data word position 0 of FIFO buffer 200a, 200b, memory controller 110 can access data word 230b in FIFO buffer 200b to determine that the transaction is a read request, with the address and data content length provided in data word 230b. Memory controller 110 accesses the requested memory and returns the specified data content to be provided to the specified destination.

When memory controller 110 receives the requested data from memory module 114 (see FIG. 1) during the read operation, the total amount of data returned may be more than that which was requested in the read request operation. For example, the read request may include data length information specifying two data words. Memory module 114 may be configured to have a faster response when dealing with groups having a minimum of two, four or eight data words, for example, so that each read request operation results in the specified minimum number of data words being transferred from memory module 114 to memory controller 110. Memory controller 110 may automatically remove the unneeded data returned from memory module 114, which does not form part of the data specified in the read request operation. The remaining data that is specified by the read request operation is provided directly to the requesting entity or module based on control signals provided by memory controller 110 to each of the components that have access to memory controller 110 and memory module 114. These control signals are illustrated in FIG. 1 as signals 120, which provide a read valid signal flag to each of the connected components that serve as read data destinations. When the read valid signal flag is asserted for a component that is the destination of the data resulting from a read request, the component can read the specified data on a read data path 122. The destination may be the requesting device or any other device coupled to read data path 122.

According to an exemplary embodiment, memory controller 110 may optionally provide a data read header (not shown) for the data content obtained from memory module 114 as a result of processing the read request contained in data word 230a, 230b. Memory controller 110 can provide information related to the data read from memory module 114 as part of the data read header, including a target address from which the data was read and a length of the data. By providing a data read header in response to a read request that conforms to the disclosed system and method, enhanced performance transfers of data can be achieved during a read process. For example, if read data path 122 is configured as a FIFO buffer, the data read from memory module 114 can be transferred rapidly using pipelining techniques, where the data is transferred out of the read FIFO buffer in accordance with the length of the data content provided in the read data header given by memory controller 110.

Figure 3:
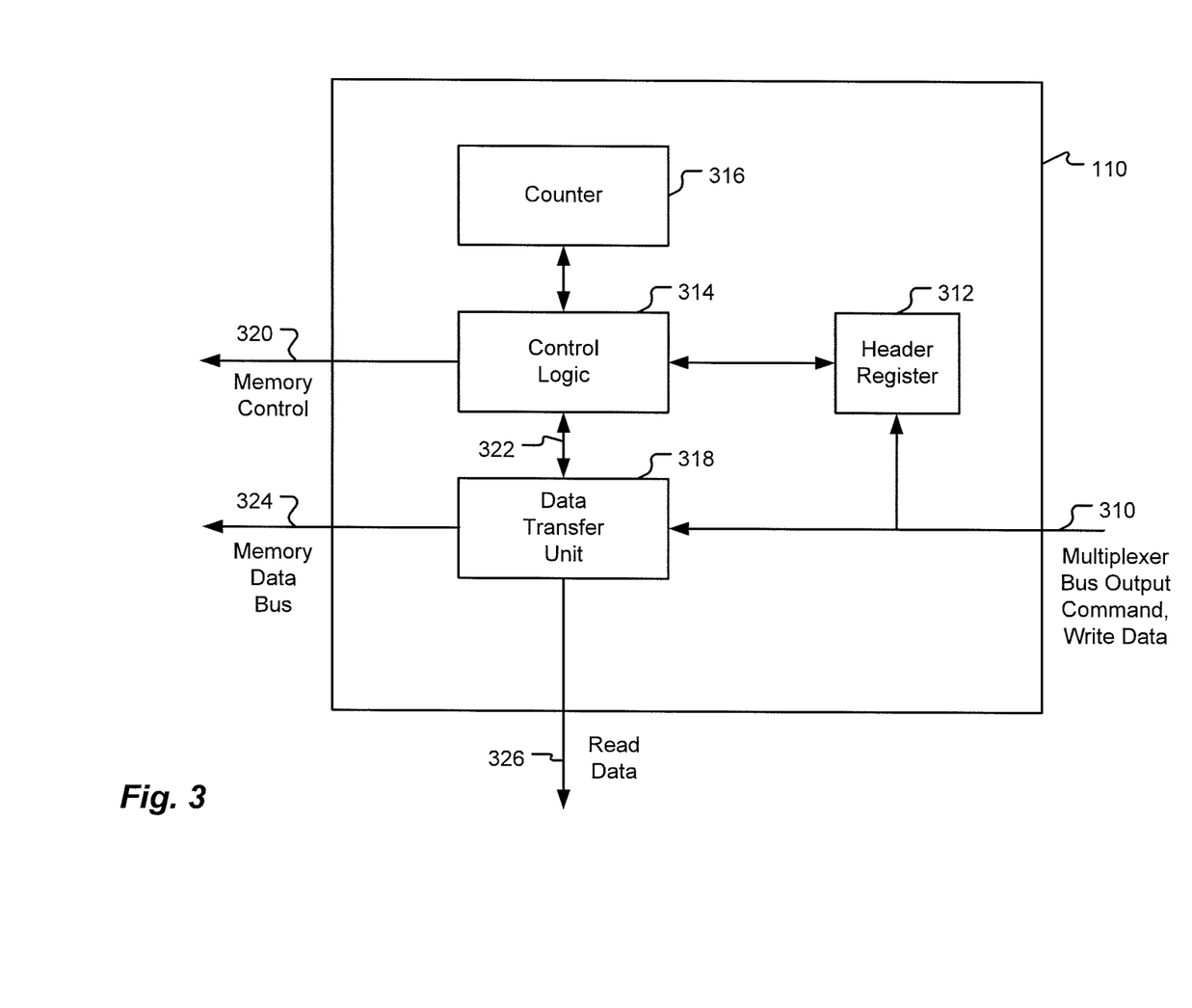
FIG. 3 is a block diagram of a memory controller in accordance with an exemplary embodiment of the disclosed system and method.

Referring now to FIG. 3, a simplified block diagram of memory controller 110 of FIG. 1 is illustrated. Memory controller 110 receives command and write data that are output from multiplexer 112 on a bus 310. Bus 310 may be as wide as a FIFO buffer data word, for example, 32 or 64 bits wide. In addition, bus 310 may include separate command signals, or may be completely represented as the width of a FIFO data word. The FIFO buffers coupled to memory controller 110 through multiplexer 112 (see FIG. 1) are of a fall-through type, which means that the first data word can be seen at the output. The data words available on Bus 310 can therefore be the first data word visible in a FIFO buffer at the data word position 0. Thus, a header is available on bus 310 and can be read and stored in header register 312. Control logic 314 can read header register 312, as well as control when header register 312 should store a header for a data transaction.

Once a header is read into header register 312, the length of the data content for the data transaction is available to control logic 314. In a write operation, control logic 314 uses the length information to store a value in a counter 316, which is used to control the data transfer from the FIFO buffer to memory module 114 (see FIG. 1). In a read operation, control logic 314 uses the length information to store a value in counter 316, which is used to control the data transfer from memory module 114 to the destination specified in the header information in header register 312. Control logic 314 provides control signals 320 to memory module 114 and control signals 322 to data transfer unit 318 to execute the data transfer for the transaction.

In the case of a write data transaction, data transfer unit 318 is controlled to read data out of a FIFO through multiplexer 112 provided on bus 310 in a pipelined transfer to memory module 114. As each data word is transferred to memory module 114 and the FIFO buffer delivery data on bus 310 is shifted or indexed, counter 316 is decremented. When counter 316 reaches zero (0), the data transfer for the write transaction ceases, and no further data is read from the FIFO buffer that delivered the data through bus 310. Once the transaction is complete, a new transaction can immediately be undertaken by memory controller 110.

Optionally, control logic 314 may determine that the length information in header register 312 indicates a single or a standard data transaction is requested, so that control logic 314 can implement the data transfer immediately without having to load counter 316 with a count value to direct the data transfer. For example, the length information contained in header register 312 may indicate that a single data access operation to memory module 114 can complete the data transaction request. Memory module 114 may be configured, for example, to read or write data in operations having a minimum length of two, four or eight data words. If the requested data transaction indicated by the contents of header register 312 involves fewer data words than the minimum, the transaction can potentially be executed with a single data access operation. In such a case, control logic 314 may bypass the loading of counter 316, and execute the data access operation directly, without the need of tracking a length or progress of the data transaction.

In the case of a read data transaction, header register 312 is again loaded with the header information available at the output of the FIFO buffer connected to bus 310. Control logic 314 accesses the information in header register 312 to obtain length information for the data transaction and stores a value related to the length of the transaction in counter 316. Control logic 314 reads additional information from header register 312 and provides control signals 320 to memory module 114 to read data specified by the information in the header. The header information may include such items as a target address in memory module 114, the transaction type (read or write), an indicator of the number of data words to be processed and an identifier for the requesting device to indicate where read data should be delivered. The header may also include optional information such as a transaction priority which may be useful in situations with dual- or multi-ported architectures. The header may also contain some other optional transactional parameters such as an indicator to switch from a linear data word ordering to an interleaved data word ordering for the memory.

When the data is read from memory module 114 in a read transaction, data transfer unit 318 receives the data on a bus 324 and delivers the data through bus 326 under the control of control logic 314 as provided with control signals 322. With each data word that is fetched from memory module 114 and transferred to data transfer unit 318 on memory data bus 324, control logic 314 decrements counter 316 to track the read data transfer. As data words are transferred from memory data bus 324 to read data bus 326, counter 316 is decremented until it reaches a value of zero (0), at which point the transaction is considered completed, and memory controller 110 can be used for other transactional processing.

When read data is transferred from bus 324 to bus 326 through data transfer unit 318, some of the data read from memory module 114 may be extraneous to the read data request. For example, memory module 114 may be configured to conduct data transfer operations based on a minimum transfer length of two, four or eight data words. If the starting or target address for the data transaction does not fall on a two, four or eight data word boundary, additional data words are returned as part of the read data transaction, which fall outside the memory locations specified by the address and transaction length information in the read data transaction request. Control logic 314, in such an instance, causes data transfer unit 318 to discard the extraneous data, so that the returned data in response to the read data transaction request is the specific data indicated by the request.

In addition, when the read data transaction request indicated by the content of header register 312 calls for a data transaction that can be executed in a single or a small number of data access operations directed at memory module 114, control logic 314 may omit loading a value into counter 316 that represents a length of the data content of the request. For example, and as discussed above, memory module 114 may be configured to have a minimum transaction length of two, four or eight data words. If the read data transaction request involves fewer data words than the minimum length in such a configuration, the read data transaction can potentially be completed as a single data access operation on memory module 114. In such an instance, control logic 314 may bypass the use of a count, or loading and decrementing counter 316.

When a read data transaction is executed by control logic 314, the starting or target address in memory module 114 may not fall on a data word boundary that represents a minimum data word access operation in accordance with the configuration of memory module 114. For example, and as discussed above, memory module 114 may be arranged to execute data transactions with a minimum of a two, four or eight data word payload. If a read data transaction request has a target address or length that causes the beginning or end of the data transaction payload to be unaligned with a minimum data word transaction boundary, additional data words can be returned as a result of the data access operation that do not form part of the specified data to be read from memory module 114. In such an instance, control logic 314 causes the extraneous data to be discarded from the response provided to the destination specified in the read data transaction request. Accordingly, the data returned in the response to the read data transaction request is the data specified by the request, without additional or extraneous data.

When a read transaction occurs, control logic 314 can optionally produce a header (not shown) for the read data that is prepended to the data. The header may contain data length information such as the number of data words, along with other information to indicate the destination for the read data, as well as optionally indicating whether the data is linear or interleaved, plus appropriate signals for handling dual or multi-ported architectures. Accordingly, the read transaction can be implemented to provide a facility through the header information to permit pipelined random length burst operations when reading data from memory module 114 to take advantage of the disclosed system and method.

Memory controller 110 may also implement data masking on an automatic basis to compensate for data in a write request that does not fall on a particular data word boundary, as discussed above. Similarly, unaligned data returned as a result of a read request may be automatically discarded to permit the specifically requested amount of data to be sent back to the destination specified in the request. For example, memory controller 110 may discard unaligned data that is returned from memory module 114 as part of a block of data words, even if the start address is not aligned on a burst boundary, to obtain the specifically requested data. Memory controller 110 may also generate refresh cycles internally so that components coupled to bus 310 need not send refresh commands to refresh the SDRAM implemented in memory module 114.

Figure 4:
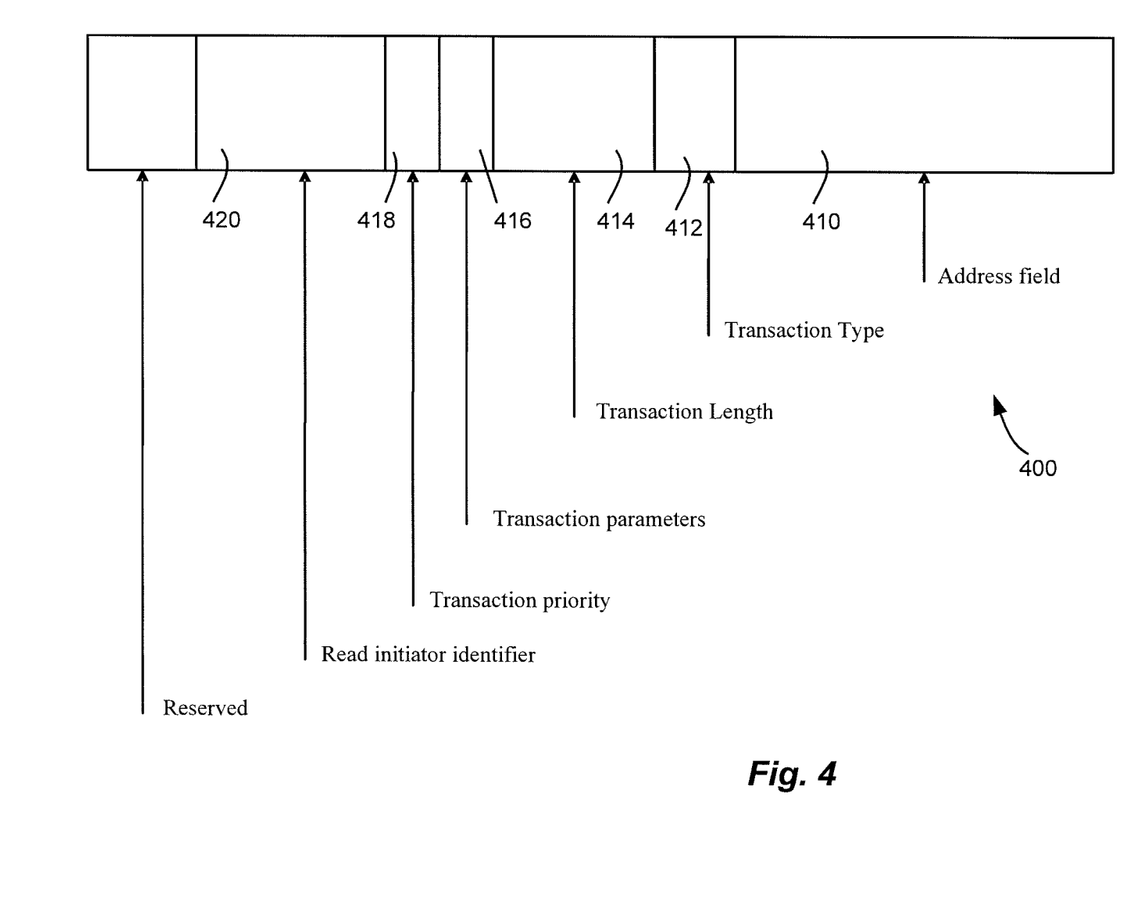
FIG. 4 is a diagram of a header for a data transaction in accordance with an exemplary embodiment of the disclosed system and method.

Referring now to FIG. 4, an exemplary embodiment of a content of a header 400 is illustrated. Header 400 may be exemplary implemented as header 211a, 221a, 22b, 230a or 230b. Header 400 includes an address field 410, a transaction type 412, transaction length 414, transaction parameters 416, transaction priority 418 and a read initiator identifier 420. Address field 410 specifies the address and memory module 114 (see FIG. 1) that is the target of the transaction. Transaction type 412 indicates whether the transaction is a read or a write transaction, for example. Transactions other than reads or writes may also be implemented, such as a precharge, status or refresh command, for example. Transaction length 414 indicates the length of the transaction to be processed. Transaction length 414 may be provided as a binary count value suitable for use in counter 316 (see FIG. 3) used by memory controller 110 (see FIG. 1) to transfer the specified amount of data out of a FIFO buffer in a pipelined transaction. Transaction length 414 may, however, include any type of representation that may be used by memory controller 110 to provide an indication of the length of the data transaction. For example, transaction length 414 may be configured to count blocks of data words, in accordance with a convention that may be imposed by memory controller 110. In addition, or alternately, transaction length 414 may contain information that indicates how many indexes or shifts should occur in transferring data, such as by including a string of logic values that terminate with a different logic value. The string of logic values may indicate how many shifts or indexes should occur from a given FIFO buffer to memory module 114 in a given pipelined random length burst operation.

Transaction parameters 416 may be used to optionally represent whether the data read from memory module 114 is arranged linearly or interleaved. For example, some microprocessors require an interleaved ordering for read operations where the read data is arranged in a different order than a linear data stream. Transaction parameters 416 can provide control information to memory controller 110 to permit the read data to be recognized as linear or interleaved.

Transactional priority 418 provides an indication of priority of a transaction, which can be useful in instances where FIFO buffers or memory is arranged in a dual or multi-ported architecture. The priority indicated in transaction priority 418 can be used by memory controller 110 to process a given transaction before other lower priority requests. Prioritization based on the value of transaction priority 418 may be handled by arbiter 118 (see FIG. 1), for example.

Read initiator identifier 420 indicates the destination of a data provided in a read request. For example, a number of components may be coupled to bus 310 (see FIG. 1), each of which can request data to be read from memory module 114. The returned read data can be delivered to the appropriate read request initiator using the information in read initiator identifier 420.

Figure 5:
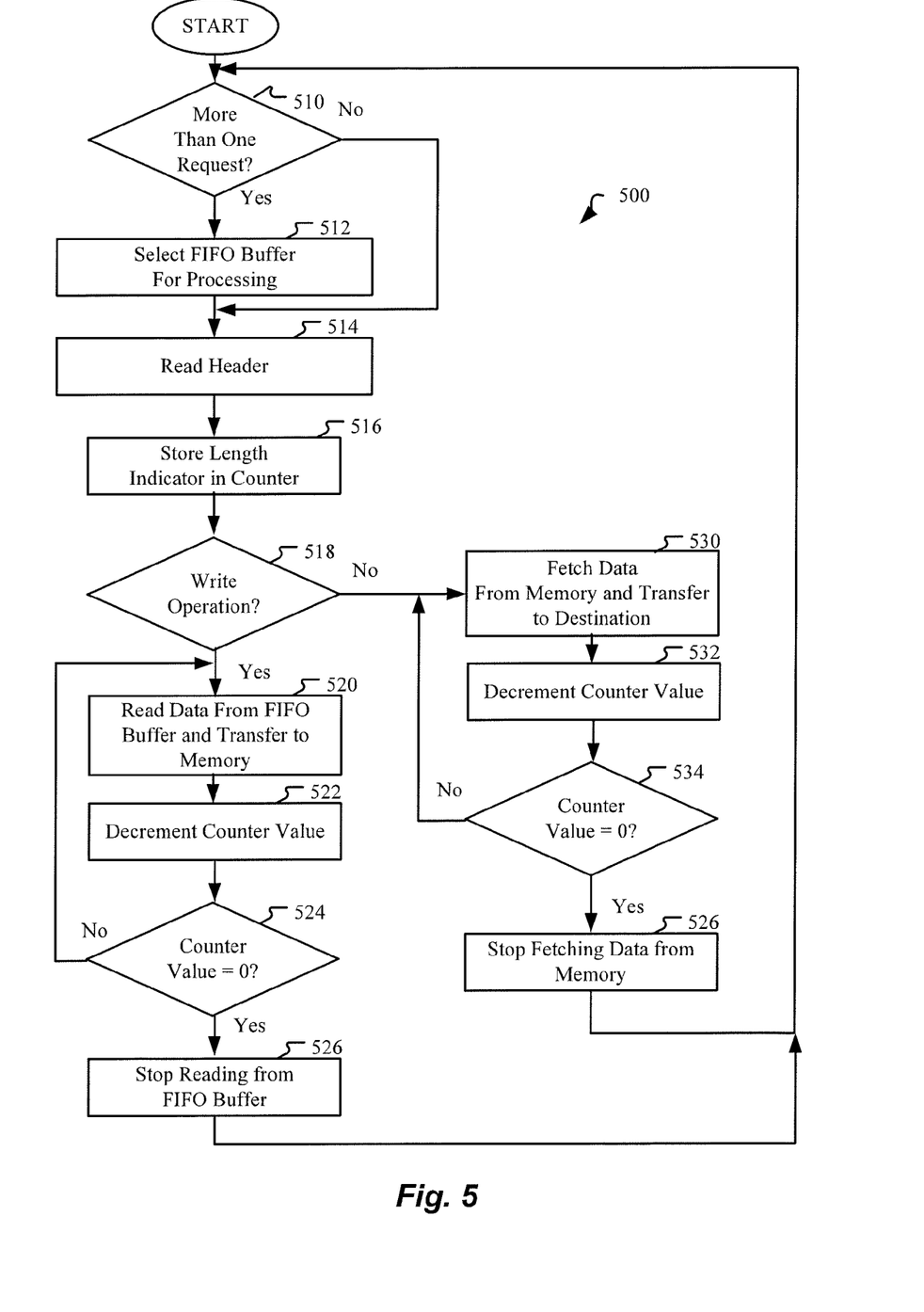
FIG. 5 is a flowchart illustrating an exemplary embodiment of the disclosed system and method.

Referring now to FIG. 5, a flow chart 500 illustrates a process for handling data transactions in accordance with an exemplary embodiment of the disclosed system and method.

Decision block 510 determines if more than one request for a data transaction is pending among the several different FIFO buffers that may be utilized by different components of the memory processing system. If more than one request is pending, processing flows to block 512, where a particular FIFO buffer is selected for data transaction processing. The selection of the particular FIFO buffer that is processed for the data transaction is determined by arbiter 118 illustrated in FIG. 1.

Arbiter 118 may select a particular FIFO buffer 115-117 based on various predetermined or adaptable criteria. For example, arbiter 118 may examine criteria related to one or more of priority, a round robin selection, whether the transaction is a read or write, or on the basis of particular signal flags that may be provided in the header of the different FIFO buffers 115-117. Memory controller 110 may also provide signal flags to assist arbiter 118 in selecting a particular FIFO buffer 115-117 for processing. In addition, arbiter 118 may examine the address indicated in the header of the different FIFO buffers to determine if a page hit would occur. For example, memory module 114 may be arranged in storage blocks referred to as "pages," where increased performance can be obtained for transactions occurring on the same page, sometimes referred to as a "page hit." If an already open page is to be accessed within memory module 114 (see FIG. 1) based on the address indicated in the header, arbiter 118 may select a FIFO buffer 115-117 to specifically avoid or cause a page hit. Any type of arbitration process known to those of ordinary skill in the art may be used that selects a given FIFO buffer over another when multiple transactions are pending in the different FIFO buffers. It is currently preferred for the arbitration to take place during time intervals when memory module 114 is unavailable, such as during precharge operations or refresh cycles, or in a pipelined look-ahead operation.

There may be a single FIFO buffer with a pending data transaction, as determined by the No branch of decision block 510. In any event, memory controller 110 (see FIG. 1) reads the header of the single or the selected FIFO buffer in block 514. Processing then proceeds to block 516, where the length indicator included in the header is stored in a counter and memory controller 110. In an exemplary embodiment, the length indicator may be stored in a counter 316 (see FIG. 3) that is decremented with each data word that is transferred between memory controller 110 and memory module 114.

In decision block 518, a determination is made as to whether the data transaction is a write operation or a read operation. If the data transaction is a write operation, processing proceeds along the Yes branch of decision block 518 to block 520, where data is read from the FIFO buffer. In block 520, data is read from the FIFO buffer and transferred to memory module 114, wherein it is currently preferred for the transfer to occur in a pipelined burst operation. The counter value stored in the memory controller is decremented with each data word transferred as indicated in block 522. Decision block 524 determines whether the value of counter 316 has been decremented to zero (0), and if so, processing transfers to block 526 where read operations from the selected FIFO buffer are halted. Accordingly, when the data transaction for a write operation has caused all of the data words indicated by the length indicator to be read from the selected FIFO buffer, read operations on the selected FIFO buffer are halted. In this way, the data for the write transaction is read from the FIFO buffer, and the FIFO buffer is not advanced beyond the present transaction. If additional transactions are stored in the selected FIFO buffer, those transactions are not shifted or indexed out of the FIFO buffer, since reading from the FIFO buffer, which would normally cause a shift or index of the information in the FIFO buffer, is halted by the value of counter 316 being zero (0), as determined in decision block 524.

If decision block 524 indicates that the value of counter 316 is greater than zero (0), processing transfers to block 520, where additional data is read from the FIFO buffer and transferred to memory. Accordingly, the operations in block 520, block 522 and decision block 524 are repeated until the data content is transferred from the FIFO buffer to memory module 114.

If the data transaction is a read operation, processing transfers from decision block 516 through the No branch to block 530, where the data at the address indicated in the header is fetched from memory module 114. According to an exemplary embodiment, the data fetched from memory module 114 is transferred to the destination specified in the header, as read in block 514. The fetched data may be automatically aligned to discard extraneous read data that may be returned from memory module 114 if the starting or target address for the read data does not fall on a minimum data word transfer boundary, as discussed above. When a data word is transferred in block 530, processing proceeds with block 532, in which the counter value is decremented. In decision block 534, a determination is made on whether the counter value has reached zero (0). If so, processing continues along the Yes branch to block 536, where no further data is fetched from memory module 114. Otherwise, if the counter value is not zero (0), processing returns to block 530 along the No branch of decision block 534, to obtain additional data words from memory module 114. Thus, the operations of blocks 530, 532 and decision block 534 are repeated until all the specified data words are read from memory module 114, at which point processing transfers along the Yes branch of decision block 534 to cease read access operations, as indicated in block 536.

In an exemplary embodiment, memory controller 110 may prepend a header to the data fetched from memory module 114. By prepending a header to the fetched data, pipelining of random length burst operations can be used to implement a data read transaction in accordance with the presently disclosed system and method.

Once the data read from memory module 114 is on the way to the specified destination, memory controller 110 is free to process another request. Processing thus flows to decision block 510 to begin processing further data transaction requests.

Figure 6:
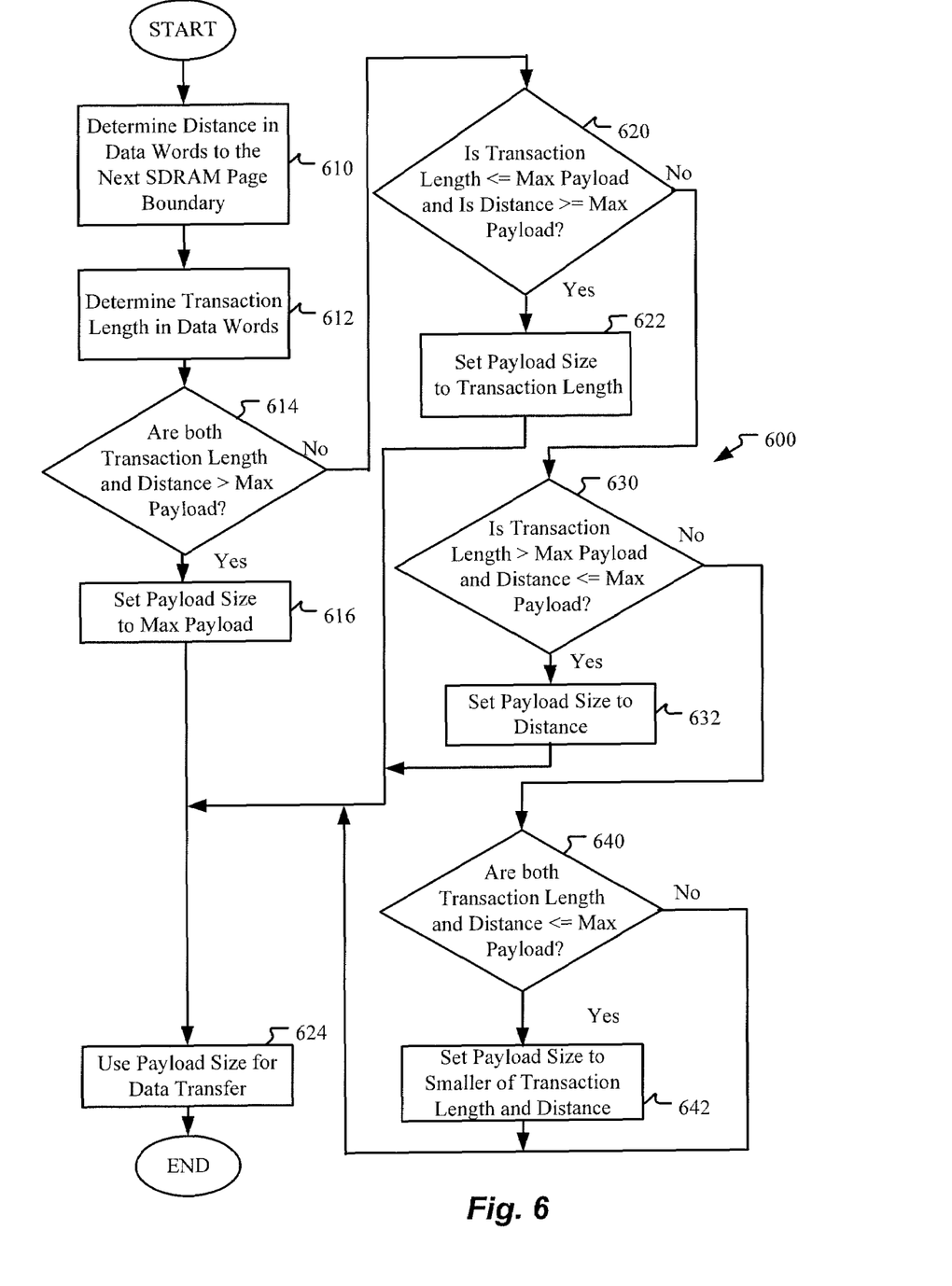
FIG. 6 is a flowchart illustrating a process for determining payload size for a data transaction in accordance with an exemplary embodiment of the disclosed system and method.

Referring now to FIG. 6, a flow chart 600 illustrates a process for a component of the memory processing system to determine an appropriate payload size for the data content in accordance with an exemplary embodiment of the disclosed system and method. The requesting device calculates the length indication for the size of the desired data transaction and includes the length indication in the header that can be read by memory controller 110 (see FIG. 1). Typically, requesting devices, which can be components such as a CPU, one or more DMA engines or a PCIe, as non-limiting examples, are aware of or can indicate the desired payload size for the desired data transaction. For example, typical microprocessors operate with single cycle or fixed length burst operations. For PCIe operations, the payload size is known from the packet information provided as part of the data transaction. DMA engines also are aware of the payload size as part of the data transfer parameters. Accordingly, there is no significant extra processing that need take place to implement the disclosed system and method. In addition, implementations of the above requesting devices are usually executed in hardware, which typically permits the determination of payload size to be done in parallel with the transaction set up.

In block 610, a determination is made of the distance, in data words, from a starting or current memory location to the next page boundary in memory module 114 (see FIG. 1) implemented as an SDRAM. SDRAMs are generally organized in memory pages, usually about 2 Kb in size. A data transfer transaction generally does not span a page boundary. In block 612, a determination is made as to the length of the desired data transaction in data words that the component seeks to have executed. The component may be any of various devices that can be coupled to a FIFO buffer to supply data transaction requests to memory controller 110. Examples of such components may include a CPU interface, a DMA transfer device, a packet receiver/transmitter system, as well as other components that may seek access to memory module 114, as exemplarily illustrated in FIG. 7.

A maximum payload size is used in the process of determining an appropriate payload size as well. The maximum payload size is a predetermined value that may depend on performance-or application-specific constraints and may be set to conform with a given standard for payload size, depending on connected components used in the memory processing system. Typical examples of maximum payload size are 32 and 64 data words; however, the maximum size can vary depending upon system specifications, for example. Determinations such as whether the transaction size is smaller than the predetermined maximum payload size, whether the boundary distance is smaller than the predetermined maximum payload size, or whether the payload size or the boundary distance is greater may be conducted prior to the determination of the appropriate payload size to contribute to speeding the process.

In decision block 614, a determination is made as to whether both the transaction length and distance in data words from the starting address of the transaction to the next page boundary are greater than a maximum payload size. If decision block 614 determines that both the transaction length and distance to page boundary are greater the maximum payload size, then processing flows to block 616, where the payload size is set to the maximum value. Once the payload size is set, processing transfers to block 624, where the determined payload size is used for the data transfer from the component to a corresponding FIFO buffer, the contents of which are then processed by memory controller 110.

If one or both of the conditions of decision block 614 are not met, processing flows to decision block 620. In decision block 620, the conditions are checked as to whether transaction length is less than or equal to the maximum payload size and whether the distance to page boundary is greater than or equal to the maximum payload size. If both these conditions are met, processing transfers to block 624, where the payload size is set to the transaction length. The thus determined payload size is used for the data transfer in block 624.

If one or both of the conditions of decision block 620 are not met, processing transfers to decision block 630, where the conditions are checked as to whether the transaction length is greater than the maximum payload size and whether the distance to page boundary is less than or equal to the maximum payload size. If both conditions are met, processing transfers to block 632, where the payload size is set to the distance in data words to the next page boundary. The determined payload size is then used for the data transfer, as indicated in block 624.

If one or both the conditions of decision block 630 are not met, processing transfers to decision block 640, where the conditions are checked as to whether both the transaction length and the distance to page boundary are less than or equal to the maximum payload size. If both these conditions are met, processing transfers to block 642, where the payload size is set to the smaller of the transaction length and the distance in data words to the next page boundary. This payload size is then used for the data transfer, as indicated in block 624.

If one or both of the conditions of decision block 640 are not met, processing flows to block 624, where the payload size is used for the data transfer. The No branch out of decision block 640 is optional and used for illustration purposes, as the range of conditions for combinations of distance to page boundary and transaction length are handled with the Yes branches out of decision blocks 614, 620, 630 and 640.

In each of the above instances, the given component that seeks a data transaction involving memory module 114 can determine the payload size to use in the data transaction to take advantage of pipelined burst operations for data transfers. Some components may already have transaction lengths for data transactions that are less than or equal to the maximum payload size, and, as such, may not go through the process indicated in flow chart 600. However, the disclosed system and method provides for a technique to determine appropriate payload size based on a maximum payload size and the distance in data words to the next page boundary indicated by memory module 114.

Figure 7:
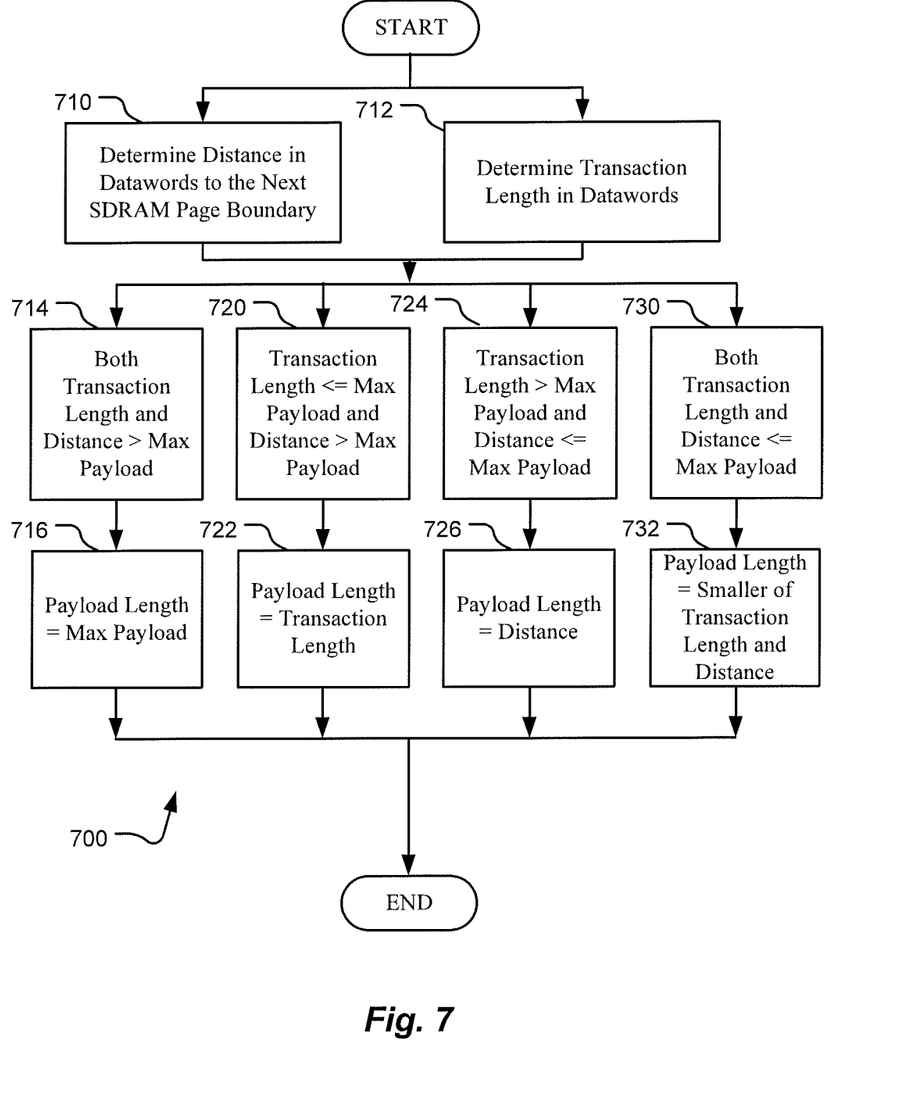
FIG. 7 is a flowchart illustrating a process for determining payload size for a data transaction in accordance with an exemplary embodiment of the disclosed system and method.

Referring now to FIG. 7, another exemplary embodiment in accordance with the disclosed system and method is illustrated with flow chart 700. The process provided in flow chart 700 illustrates how components of memory access system 100 can determine an appropriate payload size for the data content of a data transaction request. The requesting device calculates a length indicator for the size of the desired data transaction, and includes the length indicator in the header that can be read by memory controller 110 (see FIG. 1). Typically, requesting devices, which can be components such as a CPU, one or more DMA engines or a PCIe device, as non-limiting examples, are aware of or can indicate the desired payload size for the desired data transaction. For example, typical microprocessors operate with a single cycle or fixed length burst operations. For PCIe operations, the payload size is known from the packet information provided as part of the data transaction. DMA engines are also aware of the payload size as part of the data transfer parameters. Thus, there is a relatively small amount of additional processing that is used to implement the disclosed system and method over already existing implementations of memory access systems.

In block 710, a determination is made of the distance from a target memory location address to the next page boundary in memory module 114 (see FIG. 1) implemented as an SDRAM. In block 712, a determination is made as to the length in data words of the desired data transaction that the component seeks to have executed. The component may be any of various devices that seek access to memory module 114 in memory access system 100. The actions in blocks 710 and 712 may be executed in parallel, to help speed the data access process.

Blocks 714, 720, 724 and 730 may also each be executed in parallel, once the determinations indicated in blocks 710 and 712 are complete. Block 714 determines if the transaction length and distance to the page boundary are both greater than the maximum payload size. Block 720 determines if the transaction length is less than or equal to the maximum payload size and determines if the distance to the page boundary is greater than the maximum payload size. Block 724 determines if the transaction length is greater than the maximum payload size and determines if the distance to the page boundary is less than or equal to the maximum payload size. Block 730 determines if the transaction length and distance to the page boundary are both less than or equal to the maximum payload size.

Depending upon the determination indicated in blocks 714, 720, 724 and 730, the payload length is set to a value that permits rapid execution of the data transaction, based on the parameters of the target address, a desired transaction length and configuration of memory module 114, with respect to the distance to the next page boundary, as measured from the target address. If the conditions in block 714 are both true, the payload length is set to the maximum payload size in block 716. If the conditions in block 720 are both true, the payload length is set to the transaction length in block 722. If the conditions in block 724 are both true, the payload length is set to the distance to the next page boundary in block 726. If the conditions in block 730 are both true, the payload length is set to the smaller of the transaction length and the distance to the next page boundary in block 732.

As blocks 714, 720, 724 and 730 may be executed in parallel, the payload length for the data transaction can be determined rapidly in accordance with blocks 716, 722, 726, and 732. For example, the determination of the payload length for the data transaction can be executed in a single clock cycle in accordance with the operations illustrated in flow chart 700. Once the payload length for the data transaction is determined, the header for the data transaction can be modified to include the payload length determined in accordance with the process illustrated in flow chart 700.

Figure 8:
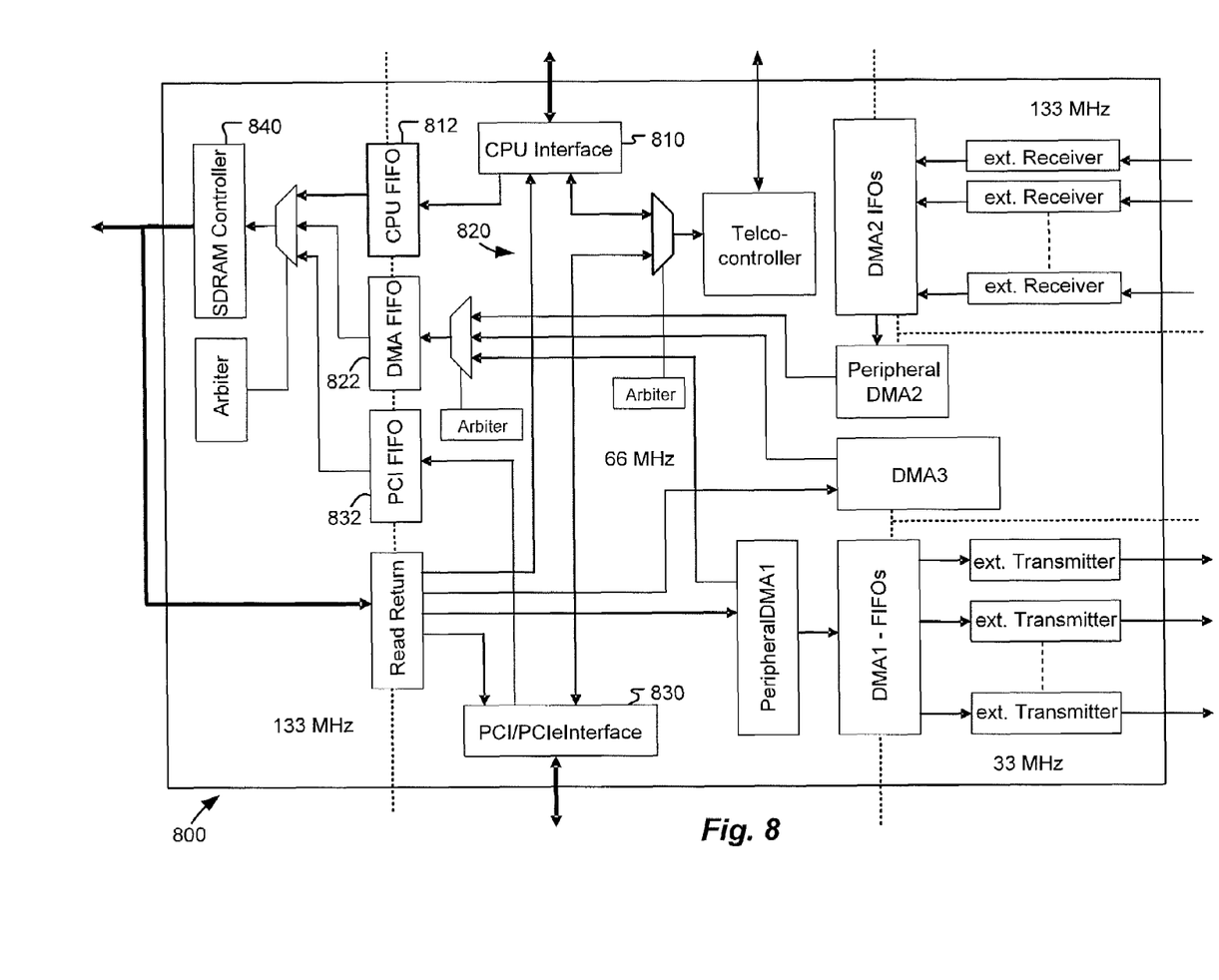
FIG. 8 is a block diagram of a telecommunications system incorporating features of the disclosed system and method.

Referring now to FIG. 8, an exemplary embodiment of a telecommunications system controller 800 employing the disclosed system and method is illustrated. Controller 800 has a multi-ported architecture, with ports that are multiplexed and arbitrated in accordance with the disclosed system and method. Each port has a dedicated connection to a certain module such as a CPU 810, DMA 820 or PCI express (PCIe) engine 830. Each port also has a dedicated dynamic FIFO buffer, i.e., FIFO buffers 812, 822 and 832, which may be implemented as FIFO buffers 115-117. The ports are tailored to the need(s) of the connected module, and arbitration can be optimized to fulfil the desired or specified bandwidth and latency requirements. The use of FIFO buffers 812, 822 and 832 provides flexibility for the different module interfaces, since some of the modules may have slower operating speed than the memory subsystem. For example, while data transactions are executed using memory controller 840 operating at 133 MHz, internal bus operations may operate at 66 MHz, while DMA transmitter operations may run at 33 MHz. With these different speed interfaces, the dynamic FIFO buffers 812, 822 and 832 provide flexibility where a simple queue empty flag or static watermark would have significant drawbacks.

The disclosed system and method provides a powerful architecture for a memory controller for synchronous DRAMs such as SDRAMs, DDR-SDRAMs and DDR2-SDRAMs, as well as other synchronous dynamic memories. The disclosed memory controller 110 (see FIG. 1) operates with high performance for all types of accesses, including variable burst length accesses to the memory module 114. Memory controller 110 can operate with any number of pipeline stages, without undue experimentation or need of significant modifications to the core state machines. Therefore, the disclosed system and method is easily adaptable for higher clock rates, such as those which may be used in configurable logic devices such as FPGAs. The disclosed memory controller 110 can be separately adjusted for higher clock rates without the need to adapt any other module. Accordingly, the disclosed memory controller 110 can be optimized for random length transactions independent of clock speed or the number of pipeline stages. The disclosed system and method can also be combined with other performance-affecting techniques like multi-bank operation, look-ahead page logic or multi-ported controllers with pipelined multiplexed data paths. The disclosed memory controller can also operate well with packet based data transfer engines like PCI express or DMA controllers.

It should be emphasized that the above-described embodiments of the present invention are possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for implementing a data transaction between a transaction requesting component and a memory module, comprising:
   at least one FIFO buffer coupled to the transaction requesting component for receiving a transaction request, the transaction request including a header with a length indication specifying a predetermined amount of data for a data payload indicated by the transaction request;
   a memory controller coupled to the at least one FIFO buffer and the memory module and operable to receive the transaction request from the at least one FIFO buffer, and to access the memory module to execute the data transaction indicated in the transaction request, the transaction request being arranged as pipelined data, the memory controller being further operable to execute as pipelined data transfer in a plurality of stages for reading, at a respective stage of the pipelined data transfer, an amount of the data payload corresponding to the predetermined amount of data specified by the length indication from one of the at least one FIFO buffer and the memory module; and
   a counting device in the memory controller operable to receive the length indication as a count value, and to update the count value as the memory controller executes the data transaction such that the counting device can provide a transaction complete indication when the updated count value indicates that the memory controller has read, at the respective stage of the pipelined data transfer, the amount of the data payload corresponding to the predetermined amount of data specified by the length indication.

2. The system according to claim 1, wherein the length indication comprises a count of data words.

3. The system according to claim 1, further comprising prioritization information in the header.

4. The system according to claim 1, further comprising information in the header to indicate a linear or interleaved burst ordering.

5. The system according to claim 1, further comprising:
   an arbiter coupled to the at least one FIFO buffer and the memory controller, and operable to receive the header; and
   a multiplexer communicatively coupled between the at least one FIFO buffer and the memory controller, and being controllable by the arbiter to selectively connect the at least one FIFO buffer to the memory controller based on a content of the header.

6. The system according to claim 1, further comprising a header register in the memory controller for receiving the header and providing the length indication to the counting device.

7. The system according to claim 1, further comprising at least one FIFO buffer coupled to the memory controller for receiving data read from the memory module.

8. A method of implementing a data transaction between a transaction requesting component and a memory module, the method comprising:
   forming a transaction request that is arranged as pipelined data that includes a header with a length indication specifying a predetermined amount of data for a data payload indicated by the transaction request;
   storing the transaction request in a FIFO buffer;
   receiving the transaction request from the FIFO buffer at a memory controller;
   storing the length indication as a count value in the memory controller;
   executing the data transaction while updating the count value to reflect execution of the data transaction, the executing of the data transaction including executing a pipelined data transfer in a plurality of stages for reading, at a respective stage of the pipelined data transfer, an amount of the data payload corresponding to the predetermined amount of data specified by the length indication from one of the at least one FIFO buffer and the memory module; and
   completing execution of the data transaction when the count value indicates that the amount of the data payload corresponding to predetermined amount of data specified by the length indication has been read at the respective stage of the pipelined data transfer.

9. The method according to claim 8, further comprising using a counting device in the memory controller to store and update the count value.

10. The method according to claim 8, further comprising forming the length indication as a count of data words in the data content.

11. The method according to claim 8, further comprising forming the header to include prioritization information.

12. The method according to claim 8, further comprising forming the header to include information to indicate a linear or interleaved burst ordering.

13. The method according to claim 8, further comprising:
    arbitrating between the transaction request stored in the FIFO buffer and another transaction request stored in another FIFO buffer; and
    selectively connecting the FIFO buffer or the another FIFO buffer to the memory controller based on a content of the header.

14. The method according to claim 8, further comprising receiving the header in a header register in the memory controller.

15. The method according to claim 8, further comprising masking unaligned write data in a write data transaction.

16. The method according to claim 8, further comprising, discarding an extraneous data resulting from an unaligned read data transaction.

17. The method according to claim 8, further comprising transferring data from the memory module to a read data FIFO buffer in a read data transaction.

18. A method for implementing a data transaction request between a transaction requesting component and a memory module, comprising:

forming the request as pipelined data that includes a header with a payload size indication for a data content related to the request;

applying the request to a memory controller through a FIFO buffer; and accessing the memory module using the memory controller to transfer the data content under control of the memory controller;

wherein forming the request further comprises determining the payload size indication for the data content by:

determining a distance in data words from a starting memory location to a next memory page boundary;

comparing a total length of the data transaction and the distance to a predetermined maximum payload size; and setting the payload size indication to one or more of the total length, distance or predetermined maximum payload size based on a result of the comparison.

19. The method according to claim 18, further comprising setting the payload size indication to the predetermined maximum payload size if each of (a) the total length and (b) the distance is greater than the predetermined maximum payload size.

20. The method according to claim 18, further comprising setting the payload size indication to the total length if both (a) the total length is less than or equal to the predetermined maximum payload size, and (b) the distance is greater than the predetermined maximum payload size.

21. The method according to claim 18, further comprising setting the payload size indication to the distance if both (a) the total length is greater than the predetermined maximum payload size, and (b) the distance is less than or equal to the predetermined maximum payload size.

22. The method according to claim 18, further comprising setting the payload size indication to the smaller of the (a) total length and (b) the distance if each of the total length and the distance is less than or equal to the predetermined maximum payload size.

23. A method of implementing a write data transaction between a write transaction requesting component and a memory module, the method comprising:

forming a write transaction request as pipelined data with a header and a write data payload, the header including a length indication specifying a predetermined amount of data for the write data payload;

storing the write transaction request in a FIFO buffer;

receiving the header from the FIFO buffer at a memory controller;

storing the length indication as a count value in the memory controller;

executing a pipelined data transfer in a plurality of stages to read, at a respective stage of the pipelined data transfer, an amount of the write data payload corresponding to the predetermined amount of data specified by the length indication from the FIFO buffer;

writing the amount of the write data payload to the memory module; and updating the count value to reflect the writing of the amount of the write data payload to the memory module, such that no further reading from the FIFO buffer occurs for the write data transaction when the count value indicates that the amount of the write data payload corresponding to the predetermined amount of data specified by the length indication has been written to the memory module at the respective stage of the pipelined data transfer.

24. A method of implementing a read data transaction between a read transaction requesting component and a memory module, the method comprising:

forming a read transaction request as pipelined data that includes a header with a length indication specifying a predetermined amount of data for a read data payload;

storing the read transaction request in a FIFO buffer;

receiving the header from the FIFO buffer at a memory controller;

storing the length indication as a count value in the memory controller;

executing a pipelined data transfer in a plurality of stages to read, at a respective stage of the pipelined data transfer, an amount of the read data payload corresponding to the predetermined amount of data specified by the length indication from the memory module; and updating the count value to reflect the reading of the amount of the read data payload from the memory module, such that the count value indicates that the amount of the read data payload corresponding to the predetermined amount of data specified by the length indication has been completely read from the memory module at the respective stage of the pipelined data transfer.

25. A telecommunications controller, comprising:

a memory module for storing data;

a memory controller for controlling data transactions with the memory module; and a memory implemented as a FIFO buffer;

wherein the telecommunications controller is operative to implement the method of claim 8.

* * * * *